ered Dec. 19, 1972

United States Patent Office 3,706,817
Patented Dec. 19, 1972

3,706,817
BLOCK COPOLYMERS HAVING DISSIMILAR NONELASTOMERIC POLYMER BLOCKS
Milton M. Wald and Myron G. Quam, deceased, by Milton M. Wald, legal representative, Walnut Creek, Calif.; said Wald assignor to Shell Oil Company, New York, N.Y.
No Drawing. Continuation-in-part of application Ser. No. 806,763, Dec. 24, 1968, which is a continuation-in-part of abandoned application Ser. No. 333,671, Dec. 26, 1963. This application May 5, 1971, Ser. No. 140,613
Int. Cl. C08f 19/06, 19/08
U.S. Cl. 260—880 B          6 Claims

ABSTRACT OF THE DISCLOSURE

The resistance to creep is substantially improved in block copolymers which are selectively hydrogenated and have within the same block copolymeric molecules non-elastomeric blocks A and C and elastomeric blocks B wherein, prior to hydrogenation, blocks A are homopolystyrene blocks, blocks B are conjugated diene polymer blocks and blocks C are homopolymer blocks of alpha methyl styrene; and due to hydrogenation, no more than about 25% of the double bonds in blocks A and C are reduced and at least 90% of the aliphatic double bonds of blocks B are reduced.

---

This application is a continuation-in-part of copending application Ser. No. 806,763, filed Dec. 24, 1968, now U.S. Pat. 3,595,942 which in turn is a continuation-in-part of application Ser. No. 333,671, filed Dec. 26, 1963, now abandoned.

The hydrogenation of ordinary rubbers such as polybutadiene as well as other polymers has been carried out in the past with the primary intent of providing polymeric substances which are more stable with respect to ozone or oxygen. For the most part, the hydrogenation of vulcanizable rubbers such as polybutadiene or polyisoprene results in materials which, while saturated or virtually so, are also seriously degraded with respect to their molecular weight. Since such polymers always require vulcanization in order to attain their maximum physical properties, such molecular weight degradation is not of primary importance.

More recently, specialized classes of block copolymers have been synthesized illustrated by such polymers as those having the structure polystyrene-polyisoprene-polystyrene. Within certain molecular weight limitations and certain proportions of end blocks to center blocks, such polymers are referred to as thermoplastic elastomers in view of the fact that above their softening points they behave like thermoplastic materials and can be processed in ordinary thermoplastic processing equipment. When utilized below their softening points they exhibit the properties normally associated with vulcanized elastomers without having been subjected to vulcanization. The advantages of such polymers are manifested in their ease of processing and their ability to be reprocessed since they have not been vulcanized. Ordinary cured rubbers cannot be reprocessed since upon vulcanization they become highly intractable materials only useful either in their original from or ground up for filler for newly formed rubber compositions.

However, the block copolymers just described suffer seriously from several limitations both with respect to their oxidation sensitivity and, particularly, with respect to their relatively low service temperatures which are limited by the softening points of the several types of blocks making up the block copolymer. The possibility exists of either utilizing the polymer without further treatment or of completely hydrogenating the entire polymer. The non-hydrogenated block copolymer has the virtue of incompatibility between the several types of polymer blocks making up the basic structure. However, as stated hereinbefore, the block copolymer is oxidation sensitive. On the other hand, the complete hydrogenation of the block copolymer results in a highly stable structure but hydrogenation of such end blocks as polystyrene and the like to the corresponding polyvinyl-cyclohexane blocks and the polyisoprene or other diene block such as polybutadiene to the corresponding ethylene-propylene or ethylene-butene rubber blocks, for example, results in two types of hydrogenated blocks being less incompatible and therefore subject to excessive creep or a rubber lacking nerve. Even when the polymer having all of its non-elastomeric blocks identical and largely non-hydrogenated while the diene blocks are hydrogenated, the products so obtained still exhibit an excessive amount of creep compared to what an ideal rubber should possess.

It is an object of the present invention to provide improved block copolymers. It is a particular object of the invention to provide selectively hydrogenated block copolymers showing substantially improved thermal and oxidative stability. It is a particular object of the invention to provide such selectively hydrogenated block copolymers having also substantially improved creep resistance. Other objects will become apparent during the following detailed description of the invention.

Now, in accordance with the present invention, block copolymers having substantially improved resistance to creep as well as excellent resistance to degradation, either thermal or oxidative, comprise selectively hydrogenated block copolymers having within the same copolymeric block molecules non-elastomeric blocks A and C separated by elastomeric blocks B wherein, prior to hydrogenation, blocks A are homopolystyrene blocks having average molecular weights between about 3,000 and 60,000, blocks B are conjugated diene polymer blocks having average molecular weights between about 25,000 and 300,000 and blocks C are homopolymer blocks of alpha methyl styrene having average molecular weights between about 3,000 and 60,000, the weight proportion of A to C blocks being between about 2:1 and 1:2; and, due to hydrogenation, no more than about 25% of the double bonds in blocks A and C are reduced but at least about 90% of the aliphatic double bonds in block B are reduced. One of the unexpected findings of the present invention was that the polymer blocks of styrene and of alpha methyl styrene may be compatible and appear to combine in domains with a glass transition temperature above that of polystyrene. This increased glass transition temperature maintains the self-vulcanizing character of the entire block copolymers up to higher temperatures and thus substantially improves the creep resistance of the polymer as compared with similar copolymers of about the same block molecular weights wherein all of the non-elastomeric blocks are identical, and where all of the non-elastomeric blocks are polystyrenes.

While the basic and preferred configuration of block copolymers of the present invention have the structure A—B—C, other linear or branched structures are also contemplated. These may be represented for example by the structures A$(B-C)_{2-5}$ and A—B$(B-C)_{2-5}$. The present invention contemplates other non-linear block copolymer configurations, such as, for example, comb-type polymers. While the broadest aspect of the present invention contemplates blocks A and C having average molecular weights from 3,000–60,000 and blocks B having average molecular weights between about 25,000 and 300,000, it is preferred that for many purposes the average molecular weights of blocks A and C be between about 8,000 and 60,000 and blocks B have an average molecular weight between about 50,000 and 300,000. The blocks B may be any one or a mixture of conjugated diene such as polybutadiene, polyisoprene or random copolymer blocks of butadiene and isoprene.

The preparation of the precursor non-hydrogenated block copolymers may proceed according to known polymerization procedures. These may be referred to as sequential processes or coupling processes. In the so-called sequential process, a monofunctional initiator such as a lithium alkyl is utilized in polymerizing styrene to form polymer block A, after which a conjugated diene monomer such as butadiene or isoprene is injected into the polymerizing mass and block polymerized with the polystyrene block to form the intermediate living polymer A–B–Li. After this, alpha methyl styrene is injected into the polymerization vessel and polymerization continued to form the desired block copolymer A–B–C. Coupling procedures are also contemplated since it is a part of the present invention to utilize the block copolymers of this invention as modifying polymers or other polymers or other block copolymers. Thus, coupling procedures may be employed to form such mixed products as follows: using separate polymerization vessels, intermediate living polymers may be prepared in one vessel, the intermediate block copolymer formed would be polystyrene-polystyrene-Li. In the second polymerization vessel, the intermediate living polymer formed would be only alpha methyl styrene-polyisoprene-Li. Desired ratios of these two intermediate polymers then would be mixed in cement form and subjected to coupling procedures. The coupling agents such as those known in the prior art may be either difunctional or polyfunctional. For the sake of simplicity, difunctional coupling is considered here such as the use of dihaloalkanes or dihaloalkenes. 1,2-dibromoethane is typical. When such a difunctional coupling agent is utilized, the resulting product is a statistical mixture of A—B—A, C—B—C and, in accordance with this invention, A—B—C. In accordance with this invention, it is preferred that the proportion of A—B—C block polymers in admixture with homopolymers or other types of block polymers be at least 25% by weight. It is possible to control this more closely in many instances by separately preparing ABC polymers and adding a precise proportion thereof to any polymer or block copolymer which it is desired to modify therewith. In addition to difunctional coupling agents such as dihaloalkanes or alkenes, polyfunctional coupling agents such as diesters, silicon tetrachloride, epoxidized polydienes, and other types of known polyfunctional coupling agents may be utilized. The products so obtained will be correspondingly more complex.

Following production of the precursor block copolymers by one of the several alternatives just discussed, it is necessary to selectively hydrogenate the products so as to obtain ABC polymers wherein no more than about 25% of the double bonds in the blocks A and C are reduced but at least about 90% of the aliphatic double bonds in the blocks B are reduced. The class of catalyst suitable for this purpose does not form a part of the present invention. However, catalysts should be chosen which result in a minimum of degradation during the hydrogenation procedure. Degradation is an especially deleterious action when applied to block polymers of this type since degradation normally occurs in the diene block. It will be understood that if chain scission occurs there at any time, the physical properties of the block copolymer are immediately destroyed and cannot be recovered. Consequently, the dual objective in selecting a catalyst system for the selective hydrogenation is to choose one which is selective for the reduction of aliphatic unsaturation with no more than a minor amount of reduction of the styrene or alpha methyl styrene double bonds and, secondly, a catalyst which is not only selective but which will perform its function without any appreciable amount of degradation.

It has been found that of all the types of catalysts potentially available for hydrogenation of these particular products, the most highly selective and non-destructive are cobalt or nickel carboxylates or alkoxides reduced with aluminum alkyl compounds. The carboxylates are preferably salts of fatty acids having from 1–18 carbon atoms in the alkyl radical of the fatty acid molecule. These include, for example, the acetates, butyrates, hexoates or octoates of nickel or cobalt. In addition to the carboxylates, cobalt or nickel alkoxides and particularly acetyl acetonates are likewise suitable when reduced with aluminum alkyl compounds.

Preparation of the hydrogenation catalysts with unusually high activity is accomplished by reacting the metal carboxylate or alkoxide with an organo-aluminum compound of the formula: $R_{3-n}AlH_n$ wherein R is a hydrocarbon group of from 1 to 10 carbon atoms, and $n$ is an integer from 0 to 3 (preferably from 0 to 2), inclusive, R may be an alkyl, aryl, alkaryl, aralkyl, or cycloaliphatic group. Examples of such groups include methyl, ethyl, n-propyl, i-propyl, n-butyl, i-butyl, sec.-butyl, tert.-butyl, pentyl, hexyl, heptyl, octyl, nonyl, decyl, phenyl, benzyl, cumyl, tolyl, cyclopentyl, cyclohexyl, cyclohexenyl, and naphthyl radicals. When R is an alkyl group, lower alkyl radicals (1 to 4 carbon atoms) are preferred (methyl, ethyl, propyl, and butyl). Although $n$ may be an integer from 0 to 2, inclusive, trihydrocarbyl aluminum compounds such as tri(lower alkyl) aluminum are preferred reducing compounds; in this preferred case $n$ is zero.

The ratio of aluminum alkyl compound to nickel or cobalt alkoxide may vary widely since even a partial reduction results in the production of an active catalyst. An aluminum to metal alkoxide molar ratio of between 0.1:1 to 10:1 may be employed but it is preferred to utilize ratios of between about 0.5:1 to 6:1.

The selective hydrogenation is effectively controlled by utilizing relatively low hydrogenation temperatures in the order of 25–175° C., preferably 35–150° C. Reaction times will vary but normally are between 5 minutes and 8 hours, preferably ½ to 4 hours. The concentration of the polymer being hydrogenated in the relative inert solvent is not an essential aspect of the present invention, it being realized by experts that the concentration will depend largely upon the other physical aspects of the process and will be chosen such that the hydrogenation product obtained eventually will be fluid enough that polymer recovery may be readily effective. Hydrogenation is normally conducted in an autoclave at hydrogen pressures below about 3,000 pounds and usually in the order of 250–1,500 pounds per square inch.

In particular accordance with the present invention, it has been found that this special type of block copolymer wherein the conjugated diene portion of the original block polymer is substantially completely hydrogenated while no more than about 25% of the aromatic double bonds of the thermoplastic aromatic polymer blocks are reduced in the hydrogenation process results in a number of physical advantages indicating great commercial potential for the substances. It has been found, for example, that they perform as pseudo-solids at temperatures in excess of 200° C. while either the fully hydrogenated or non-hydrogenated counterparts of the same polymer are fluids at temperatures in the order of 175° C. Moreover, due to the saturation of the conjugated diene double bonds by hydrogenation, the polymers have especially high resistance to oxidation and because of this it is possible to utilize processing conditions which would not have been possible with the non-hydrogenated starting material. This is especially important since the polymers have been found to have relatively poor processability at the same temperatures at which the more unstable non-hydrogenated block copolymers could be processed. Consequently it is possible to increase the processing temperatures and to combine the selectively hydrogenated products with modified materials such as polystyrene, extending oils, pigments, carbon blacks, and resins to achieve compositions especially useful for many industrial purposes.

The following example illustrates the preparation and properties of selectively hydrogenated block copolymers according to the present invention.

EXAMPLE I

Polystyryl lithium was made by dissolving 30 g. of styrene in 400 ml. of methylcyclohexane (MCH) and polymerizing at 45° C. under standard anionic conditions with the addition of 16.7 ml. of 0.12 N sec.-butyl lithium (2.0 mmoles). After two hours the S-Li (polystyryl lithium) was then mixed with 71.5 g. of liquid butadiene predissolved in 30 ml. of diethyl ether and 360 ml. of MCH. Polymerization of the butadiene was completed after about 4 hours at 42° C. 1,2-dimethoxyethane (DME) was added to the SB-Li after cooling the mixture to ~−10° C. (used a molar ratio of DME:SB Li of ~100:1) and this was followed by the addition of high purity α-methylstyrene (14.7 g.). The reaction was allowed to proceed at −10° to 20° for about one hour and then cooled to −70° and left overnight. The reaction mixture was terminated the following day by the addition of methanol after cooling again to −70° C. The polymer was purified by coagulation from methanol, inhibited with a phenolic inhibitor and dried in vacuo (50° C.).

The block copolymer prepared as described above had the following analysis: The segmental block molecular weights determined by tritium counting methods and NMR analysis of the block copolymer prepared as described above were 17,800–87,900–11,300. The butadiene block had 45% 1,2-structure and 9.7 weight percent of bound alpha methyl styrene as determined by NMR analysis. The product had a tensile strength at break of 2500 p.s.i., a 300 percent modulus of 360 p.s.i., a 500% modulus of 650 p.s.i., elongation at break 900% and a set of 19%. The polymer was then hydrogenated in methylcyclohexane-toluene mixture (70–30 wt. ratio) using a nickel octoate/aluminum triethyl catalyst at 70° C. The resulting product was found to have the structure polystyrene-poly(ethylene/butylene-poly(alpha methyl styrene). Substantially no hydrogenation occurred in either of the styrene or alpha methyl styrene polymer blocks.

The creep resistance of the selectively hydrogenated polymer described above is outstanding when compared with a similar polymer having the structure polystyrene-ethylene/butene copolymer-polystyrene, the segmental molecular weights of which were 15,000–68,000–13,000. The data are summarized in the following table. As shown in the table, the block copolymer of this invention (S—EB—αMS)

having two dissimilar non-elastomeric polymer blocks shows very little creep at 90° while the comparable block polymer having identical end blocks (S—EB—S) creeps rapidly and fails during the test period. The creep resistance of the block copolymer of the present invention indicates that the two types of non-elastomeric blocks form a composite domain with a higher glass transition temperature compared with polystyrene domains.

TABLE 1.—CREEP RESISTANCE OF S—EB—αMeS AND S—EB—S
[Load=100 p.s.i. on original cross-section]

| Polymer | Temperature (° C.) | Creep rate [1] (percent elong./hr.) | Failure time (hr.) | Remarks |
|---|---|---|---|---|
| S—EB—αMeS | 90 | <1 | >17 | No failure observed. |
| S—EB—αMeS | 102 | 9 | ≥8 | |
| S—EB—S | 90 | 19 | <17 | Failed during the night. |
| S—EB—S | 102 | 300 | <0.2 | |

[1] Observed after ~7 hours of pretesting at 80°C.

We claim as our invention:

1. Selectively hydrogenated block copolymers having within the same block copolymeric molecules nonelastomeric blocks A and C and elastomeric blocks having the general configuration

ABC

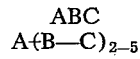

and

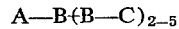

wherein prior to hydrogenation blocks A are homopolystyrene blocks having average molecular weights between about 3,000 and 60,000, blocks B are conjugated diene polymer blocks having average molecular weights between about 25,000 and 300,000, and blocks C are homo-(alpha-methyl styrene) polymer blocks having average molecular weights between about 3,000 and 60,000, the weight proportion of A:C blocks being between about 2:1 and 1:2, and due to hydrogenation no more than about 25% of the double bonds in blocks A and C are reduced and at least 90% of the aliphatic double bonds of block B are reduced.

2. A block copolymer according to claim 1 wherein the block copolymer has the structure

A—B—C

3. A block copolymer according to claim 1 wherein the block B diene is butadiene.

4. A block copolymer according to claim 1 wherein the block B diene is isoprene.

5. A block polymer according to claim 1 wherein the blocks A and C have average molecular weights between about 8,000 and 60,000.

6. A block copolymer according to claim 1 wherein the blocks B have average molecular weights between about 50,000 and 300,000.

References Cited

UNITED STATES PATENTS 3,595,942   7/1971   Wald et al. _____ 260—880 B

JAMES SEIDLECK, Primary Examiner

W. F. HAMROCK, Assistant Examiner

U.S. Cl. X.R.

260—94.7 H, 96 HY, 879 B